Sept. 3, 1935.  J. PETRONE  2,013,172
ELECTRIC COFFEE MAKER
Filed Aug. 23, 1934
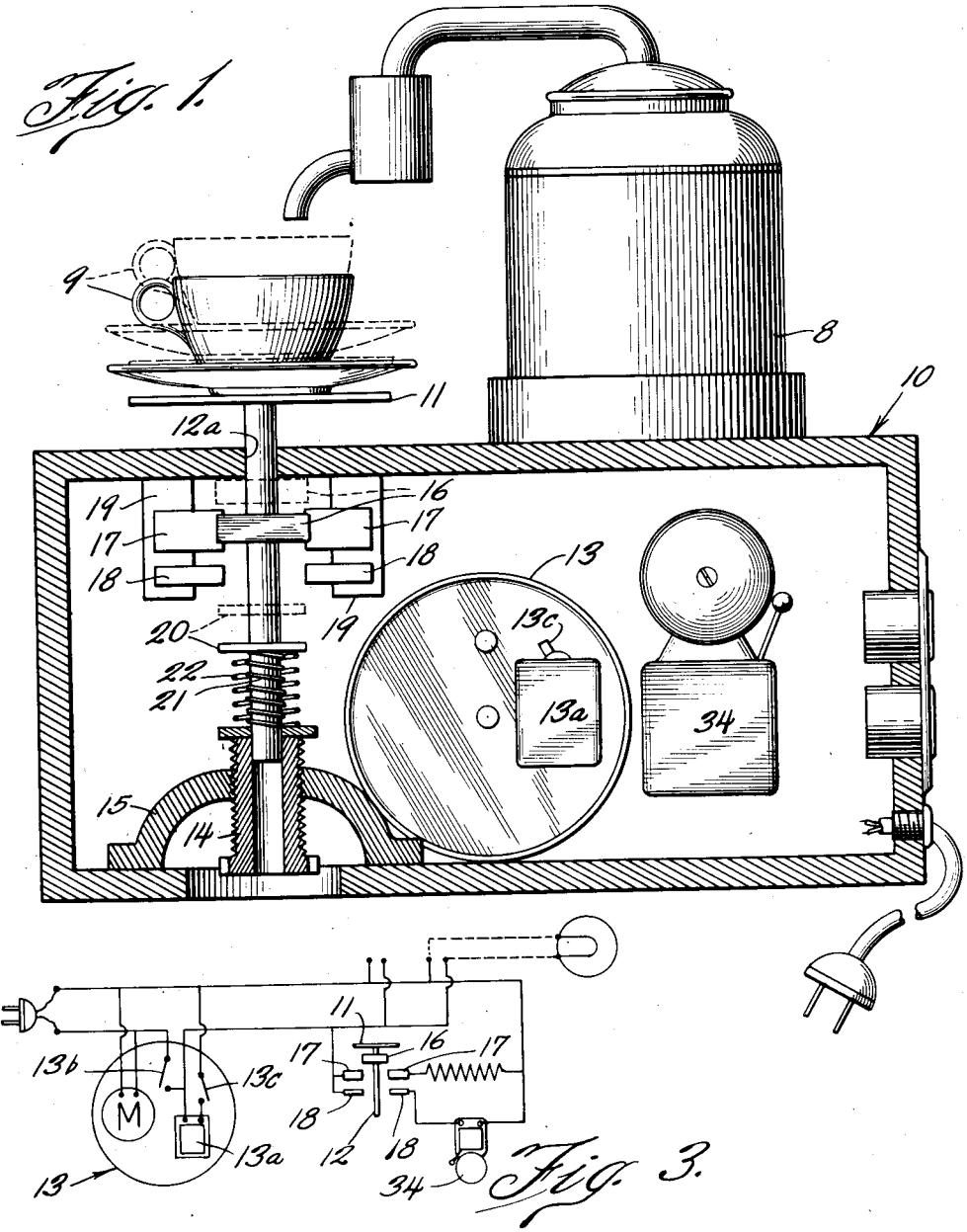

Patented Sept. 3, 1935

2,013,172

UNITED STATES PATENT OFFICE 2,013,172

ELECTRIC COFFEE MAKER

John Petrone, Chicago, Ill.

Application August 23, 1934, Serial No. 741,077

2 Claims. (Cl. 219—43)

The present invention relates to apparatus for actuating an electric device at a predetermined time and for thereafter terminating the operation of such device when its function has been performed. One use of the invention is to apply and shut off electrical energy to a coffee maker or the like. The coffee maker may be energized at a certain predetermined hour and energy supplied thereto until the coffee is ready for consumption. Concurrently with such energization of the coffee pot, an audible alarm may be actuated, lights may be turned on, or a radio receiving set energized, or all of these things.

The invention has for its object the provision of the following:

The operation of a coffee maker beginning from a predetermined hour and terminating when the coffee therein is ready to be drunk.

A circuit having a cooking device therein and closed by a time switch and opened when the function of the cooking device is completed.

An improved means for energizing and de-energizing the heating element of a coffee maker or other electric cooking element.

A combination of switches whereby control of a heating element is had from a fixed time until the function of the heating element is fully performed.

An electric time controlled novelty.

These objects, and such other objects as may hereinafter appear, are obtained by the novel construction, unique combination, and improved arrangement of the several elements which constitute the invention, one form of which is illustrated in the accompanying single sheet of drawing, hereby made a part of this specification, and in which:

Figure 1 is a longitudinal vertical section through one embodiment of the invention, the view being from the rear;

Figure 2 is a schematic detail of a switch for use in the device illustrated in Figure 1; and Figure 3 is a diagram of the circuit employed in the device illustrated in Figure 1.

The same reference characters are used to indicate like elements in the drawing and in the description which follows.

The embodiment of the invention illustrated in the single sheet of drawing appended hereto comprises a cabinet 10 of any suitable configuration and materials. Cabinet 10 supports or houses an alarm clock 13 or any other suitable time actuated switch. The alarm clock 13 may be spring actuated or driven by a synchronous motor energized by a suitable source of alternating current. The clock 13 is of a conventional type having means for setting the hands and the alarm and for winding, if mechanically actuated. The alarm mechanism may be of the twelve hour or twenty-four hour species, that is, it will operate twice in twenty-four hours or once in twenty-four hours at the fixed time determined by the setting of the hands.

The alarm clock 13 will be presumed to be of the electric type. The clock 13 will be operated by a synchronous motor and the alarm 13a will be of the electric buzzer type. In such devices there is a suitable manual switch 13b for closing the circuit to the electric buzzer, the switch 13b becoming effective at the hour set and remaining effective for a period of fifteen minutes to an hour thereafter unless the circuit to the bell is broken by a manually operated switch 13c.

Mounted in the cabinet 10 a vertically displaceable standard or rod 12 having at its top a platform or seat 11. A coffee cup and saucer 9 of predetermined weight are disposed upon the platform as is hereinafter described.

The upper portion of the rod 12 slides within an aperture 12a in the top of the cabinet 10. At its bottom, the rod 12 moves in a sleeve 14. The sleeve 14 is in alinement with the aperture 12a in the top of the cabinet. Sleeve 14 is held in position by an annular base member 15. A threaded connection may be employed.

Rod 12 may be of hard rubber, a phenol condensation product, wood, or other suitable insulating material. When preferred, rod 12 may be of metal suitably insulated. The rod 12 has near its top a collar or bar 16. Intermediate the top of the cabinet and the sleeve 14 and suitably held in position by brackets 19 or otherwise, are contacts 17 of suitable configuration. Below the contacts 17 and on the same brackets 19 if desired are other contacts 18. The vertical dimension of the face of contacts 17 is considerably greater than that of contacts 18.

Contacts 17 close a circuit to a heating element in a coffee maker 8. The coffee maker 8 generally employed is of a conventional type, now manufactured and sold, which includes a heating element, a percolator, and a reservoir. It operates substantially in the following manner. A predetermined quantity of coffee is placed therein. Thereafter a predetermined quantity of water is added. The amount of this water should be just enough to fill the cup which is disposed upon the platform 11. When the coffee maker is energized, the water circulates therein until it reaches a certain degree of temperature and/or a certain density. A valve in the maker automatically opens and the coffee which is fully cooked is then discharged through a spout. The coffee pot should rest on the top of the cabinet 10 so that the spout will be directly over the cup 9 upon the platform 11.

A collar 20 of insulating material is secured about the rod 12. Between collar 20 and collar 14, springs 21 and 22 are mounted. Two coil springs 21 and 22 are spirally wound about the rod 12. Spring 21 is of a tension that will lift the rod 12 and platform 11 to its uppermost position, when free from cup and saucer, which position is shown in dotted lines in Figure 1. At its highest position, the contact bar 16 may rest upon the underside of the top of the cabinet 10.

If a cup and saucer are placed upon platform 11, as shown in full lines in Figure 1, the force of the spring 21 is overcome, and the rod 12 drops with its load until the bar 16 establishes physical contact with the contacts 17, thus creating a path for energy between the opposed contacts 17 and closing the circuit to the coffee maker.

The force of spring 22 is such that it will maintain the rod 12 in position with the bar 16 in physical contact with the contacts 17 until the cup 9 upon the platform 11 is filled with coffee from maker 8. At that time, the force of the spring 22 is overcome to the extent that the rod 12 drops under the weight of the liquid in the cup to move the member 16 out of engagement with the contacts 17 and thus break the circuit to the coffee maker.

Further downward movement of the rod 12 causes the bar 16 to engage the contact 18 and thus close a circuit to a buzzer or bell 34 or other suitable alarm. An electric light or other signal may be substituted for the electric bell 34 described. Likewise, it is clear that one spring may take the place of springs 21 and 22. The ringing of the bell 34 indicates that the percolation of the coffee is complete and that there is a cup of hot coffee upon the platform ready for consumption. This calls for removal of the cup and saucer from platform 11.

Removal of the cup and saucer from the platform 11 breaks the circuit to the electric bell 34 and the force of springs 22 and 21 lifts the rod 12 upwardly past the contacts 17, thereafter leaving the circuit to the coffee maker open following a temporary and substantially instantaneous contact between member 16 and contacts 17 on the upward movement of the rod 12.

The alarm clock 13 may have a switch of the type illustrated in Figure 2 for closing the circuit to the coffee maker, as well as energizing the alarm 13a. The switch comprises a notched disc 27 which turns with the small hand of the clock, or if desired, it may turn half as fast as the small hand. There is a second disc 28 which has a tooth adapted to drop into the notch in disc 27. The disc 28 is selectively rotatable to determine the time at which the notched disc and tooth will register. When the tooth in disc 28 registers with the notch in disc 27, the disc 28 is moved toward the disc 27 by suitable spring means 28 which causes a switch arm 29 to make contact with a contact point 30.

The diagram in Figure 3 is illustrative of the combination of the alarm clock, alarm clock switch, the alarm clock switch closing a circuit to a light or lights, and to the coffee maker; and a standard or rod 12 and platform 11, the former having a contact member 16 engaging contacts 17 and contacts 18 in cabinet 10. A series of sockets and plugs may be used whereby each of the units, i. e., the coffee maker, or the lights, may be removed from the circuit without disturbing the operation of the clock 13. Any suitable source of power may be used. In the circuits shown, there is a plug and a socket whereby the source of power may be connected to the electric clock and may also supply the several other circuits herein mentioned.

The alarm upon the clock 13 is wholly independent of the several other elements and the circuit thereto may be broken manually in the manner heretofore described. The circuit to the lights is independent of the circuit to the coffee maker insofar as rod 12 is concerned. The lights after being energized at a selected hour remain operative so long as the switch in the alarm clock switch is effective, which effectiveness, as previously stated, may be from fifteen minutes to an hour according to the characteristics of the alarm clock.

When the sleeve 14 is threaded into base 15, it provides an adjustment in respect to the springs 21 and 22 to compensate for wear and for difference in the weights of different cups and saucers within predetermined limits.

What is claimed as new and is desired to be secured by Letters Patent of the United States is:

1. In combination with a clock, a switch actuated thereby, a source of electrical energy, and a coffee maker having a heating element, a circuit including said heating element, said switch, and said source of energy, an alarm, a second circuit to said alarm including said switch, and weight actuated means for closing and opening said circuits, said means comprising a platform to receive an object, a vertically moveable pillar and compressible by a selected weight on said platform, a second spring supporting said platform and pillar after the first spring is compressed and compressible by a greater selected weight on said platform, a contact bar on said pillar and moving therewith, top contacts connected to said first circuit and bridged by said contact bar to close said first circuit when said platform and pillar are depressed by said first selected weight, and bottom contacts connected to said second circuit and bridged by said contact bar to close said second circuit and open said first circuit when said platform and pillar are further depressed by said greater selected weight, the platform and pillar when unburdened rising to lift said contact bar above both top and bottom contacts and open both said circuits.

2. Control means comprising a platform, a vertical moveable pillar supporting said platform, a spring supporting said platform and pillar and compressible by a selected weight on said platform, a second spring supporting said platform and pillar and compressible by a greater selected weight on said platform, a contact bar on said pillar and moving therewith, top contacts connected to an electrical circuit and bridged by said contact bar when said platform and pillar are depressed by said first selected weight, and bottom contacts connected to another electrical circuit and bridged by said contact bar when said platform and pillar are further depressed by said greater selected weight, the platform and pillar when unburdened rising to lift said contact bar above both top and bottom contacts and open both said circuits.

JOHN PETRONE.